United States Patent
Smith et al.

(10) Patent No.: US 9,479,967 B1
(45) Date of Patent: Oct. 25, 2016

(54) ENHANCED MEDIA GATEWAY

(75) Inventors: Kevin Smith, Ottawa (CA); Gregory Waines, Kanata (CA)

(73) Assignee: GENBAND US LLC, Plano, TX (US)

( * ) Notice: Subject to any disclaimer, the term of this patent is extended or adjusted under 35 U.S.C. 154(b) by 2064 days.

(21) Appl. No.: 12/151,683

(22) Filed: May 8, 2008

Related U.S. Application Data

(60) Provisional application No. 61/000,566, filed on Oct. 26, 2007, provisional application No. 61/007,545, filed on Dec. 31, 2007.

(51) Int. Cl.
*H04W 28/18* (2009.01)
*H04W 88/18* (2009.01)
*H04L 29/06* (2006.01)
*H04W 4/18* (2009.01)

(52) U.S. Cl.
CPC .......... *H04W 28/18* (2013.01); *H04L 65/1069* (2013.01); *H04L 65/601* (2013.01); *H04L 69/24* (2013.01); *H04W 88/181* (2013.01); *H04W 4/18* (2013.01)

(58) Field of Classification Search
USPC ........................ 370/352, 260, 401; 709/227
See application file for complete search history.

(56) References Cited

U.S. PATENT DOCUMENTS

| | | | |
|---|---|---|---|
| 6,381,238 B1 | 4/2002 | Hluchyj | |
| 6,768,722 B1* | 7/2004 | Katseff et al. | 370/260 |
| 7,529,234 B1* | 5/2009 | Bowater | H04L 65/601 370/352 |
| 2002/0099854 A1* | 7/2002 | Jorgensen | H04L 1/20 709/249 |
| 2003/0219006 A1* | 11/2003 | Har | H04L 29/06027 370/352 |
| 2004/0095958 A1* | 5/2004 | Ejzak | H04W 88/181 370/465 |
| 2005/0047423 A1* | 3/2005 | Kaul et al. | 370/401 |
| 2007/0078986 A1* | 4/2007 | Ethier et al. | 709/227 |
| 2008/0259907 A1* | 10/2008 | Kumarasamy | H04L 65/104 370/352 |
| 2009/0172170 A1* | 7/2009 | Rey | 709/227 |

OTHER PUBLICATIONS

SONUS IMS marketing literature (8 pages).
GSX9000 Open Services Switch marketing literature.
N. Mistry, "The importance of policy-based resource control in future networks" Nortel Technical Journal, Issue 4.
T. Kang, et al., "SIP/SDP Signaling of Media Gateway with Transcoding Function in Converged Network" pp. 842-845.
ITU-T, "Gateway Control Protocol Version 1," H.248.1 (Mar. 2002).
Groves et al., "Gateway Control Protocol Version 1," Network Working Group, RFC 3525 (Jun. 2003).
Schulzrinne et al., "RTP: A Transport Protocol for Real-Time Applications," Network Working Group, RFC 1889 (Jan. 1996).
Rosenburg, et al., "SIP: Session Initiation Protocol," Network Working Group, RFC 3261 (Jun. 2002).

* cited by examiner

*Primary Examiner* — Khaled Kassim
(74) *Attorney, Agent, or Firm* — Jenkins, Wilson, Taylor & Hunt, P.A.

(57) ABSTRACT

An enhanced media gateway allows the signaling and media paths of a multimedia call to be merged so that signaling of a session and establishment of the media path may be coordinated. The enhanced media gateway may include a session border controller, gateway, router, and digital signal processors that operate in a coordinated fashion, so that information about the media path may be included in the signaling of the session, so that the media path may be directly established in connection with the session signaling, and so that bandwidth may be reserved in the router when the media path is established. This allows routing to be set up using media path signaling to obviate the use of a reservation protocol.

13 Claims, 4 Drawing Sheets

ENHANCED MEDIA GATEWAY

CROSS REFERENCE TO RELATED APPLICATIONS

This application claims the benefit of and priority to U.S. Provisional Patent Application No. 61/000,566, filed Oct. 26, 2007, entitled "MEDIA GATEWAY," the content of which is hereby incorporated herein by reference. This application also claims priority to U.S. Provisional Patent Application No. 61/007,545, filed Dec. 31, 2007, entitled "ENHANCED MEDIA GATEWAY", the content of which is hereby incorporated herein by reference.

BACKGROUND OF THE INVENTION

1. Field of the Invention

The present invention relates to communication networks and, more particularly to an enhanced media gateway.

2. Description of the Related Art

Data communication networks may include various routers, switches, bridges, hubs, and other network devices coupled to and configured to pass data to one another. These devices will be referred to herein as "network elements." Data is communicated through the data communication network by passing protocol data units, such as Internet Protocol (IP) packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

As communication networks have proliferated, corporations and individuals have become reliant on the networks for many different types of communication services. Initially, voice communications were carried on a voice network, and data communications such as e-mail were carried on a separate data (Internet Protocol or IP) network. For various reasons, those networks are being consolidated to enable telephone calls and other types of communication sessions to take place over data networks.

When a session is to be established on a data network such as an IP network, a signaling protocol such as Session Initiation Protocol (SIP) is generally used to establish the session. Once the session has been set up, the transport facilities of the IP network are used to enable the parties to communicate in the same manner as would occur if the session had been connected over an existing network such as the Public Switched Telephone Network (PSTN). One of the transport protocols commonly used to transport traffic on the underlying network is Real-time Transport Protocol (RTP). SIP is defined by the Internet Engineering Task Force (IETF) Request For Comments (RFC) 3261, and RTP is defined by IETF RFC 1889, the content of each of which is hereby incorporated by reference. SIP and RTP may be used to establish audio telephone calls, multimedia sessions involving both audio and video content, and other types of sessions.

FIG. 1 shows a common way in which a communication session such as a telephone or video call may be established on a network. As shown in FIG. 1, a user (initiator) 10 would like to initiate a new session to a second user (responder) 12. Initiator 10 will send a SIP invite message 11 to a call server 14 which implements a SIP proxy 15 on behalf of the user 10. The call server controls establishment of the call on the network. The call server will pass the message over user's local area network 16 to a Session Border Controller (SBC) 18. The SBC performs Network Address Translation (NAT) to hide the internal addresses used on the user's local area network and passes the SIP invite onto a provider network 20. Commonly this may be implemented by terminating an inbound SIP session from the call controller and originating a new outbound SIP session. A device that operates in this manner will be referred to as a Back-to-Back User Agent (B2BUA).

At the egress, the invite message is received by a SBC 22 associated with the responder's local area network 24 which performs the same functions as the SBC 18. A call server 26 implementing a SIP proxy 27 on the responder's network 24 will receive the SIP invite and pass it to the user (responder) 12. This path represents a signaling path between the initiator and responder. To accept the invite the responder will transmit an OK message 29 which will follow the signaling path in the reverse direction to reach the initiator 10. Other signaling messages may be exchanged along this path as well to allow the initiator and responder to negotiate parameters that will be used for the session.

Once the initiator and responder have completed the signaling, the session may be implemented along another path referred to herein as the media path. Specifically, the initiator 10 will transmit IP packets to a router 28 on the local area network 16. The router 28 will forward the packets to a gateway 30 which will forward the packets to the provider network 20. At the egress from the provider network, a gateway 32 to the responder's network 24 will receive the packets and pass them to a router 34 to be forwarded to the responder. The Real-time Transport Protocol (RTP) discussed above may be used to manage the end-to-end transport of the packets during the session between the initiator and responder. The reverse media path may similarly be used to transport packets from the responder to the initiator.

As part of the setup process, the call server 14 will negotiate a Coder/Decoder (Codec) that will be used to encode the voice/video data to be transmitted during the session. The Codec and other parameters such as voice quality enhancement features to be implemented for the session are determined by the call server and implemented on the call by the gateway 30. For example, the local area network and the provider network may be operating according to different protocols. The gateway 30 performs protocol translation to allow the packets associated with the session to pass from one network to the other. As part of the setup process, the call server will configure the gateway to implement the session using a protocol such as H.248. H.248 is a media gateway control protocol and is defined jointly by IETF RFC 3525 and ITU-T H.248-1, the content of each of which is hereby incorporated by reference. H.248 allows the call server 14 to define the necessary control mechanisms to configure the gateway 30 to support voice/fax calls and other types of sessions between the user IP network 16 and the Public Switched Telephone Network (PSTN) or between user's network 16 and another Internet Protocol network.

The call server 14 may also want to reserve bandwidth on the network for the call. There are many ways of reserving bandwidth on an IP network. For example, the Reservation Protocol (RSVP) may be used to establish a path through the network by causing bandwidth to be reserved on routers in the network. Thus, the call server 14 may also interface with one or more routers 28 on the network to establish the path through the network.

Although this system works well in general, there are times where it would be advantageous to reduce the number of network elements required to implement the system. Additionally, it would be advantageous to enable enhanced communication between the various network elements to enable enhanced services to be provided in connection with establishing voice and/or multimedia sessions on the network.

SUMMARY OF THE INVENTION

An enhanced media gateway allows the signaling and media paths to be implemented in a coordinated manner so that the enhanced media gateway may use information from components that will implement the media path while signaling the session, and so that parameters negotiated during the signaling may be directly implemented in the media path for the session without involvement of the call server. The enhanced media gateway in one embodiment is implemented in an edge router. This allows the call server to simultaneously reserve resources for the call while signaling call parameters to the enhanced media gateway, so that the call server is not required to separately signal reservation of those resources.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
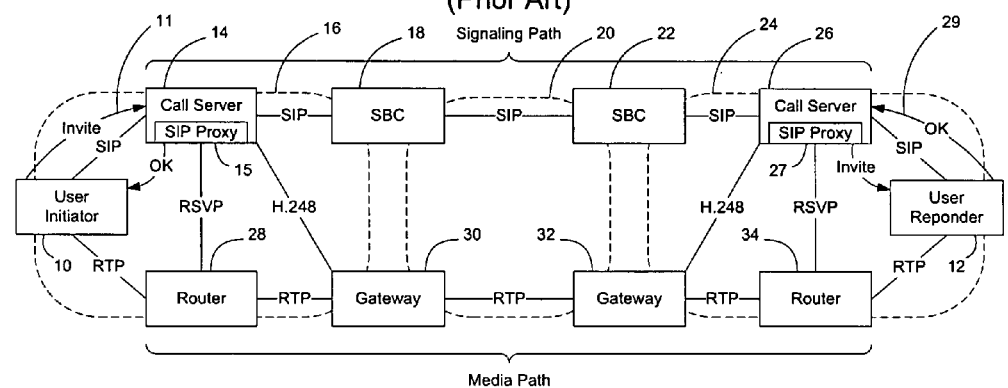
FIG. 1 is a functional block diagram of a conventional way of establishing a voice call on an IP network.
Figure 2:
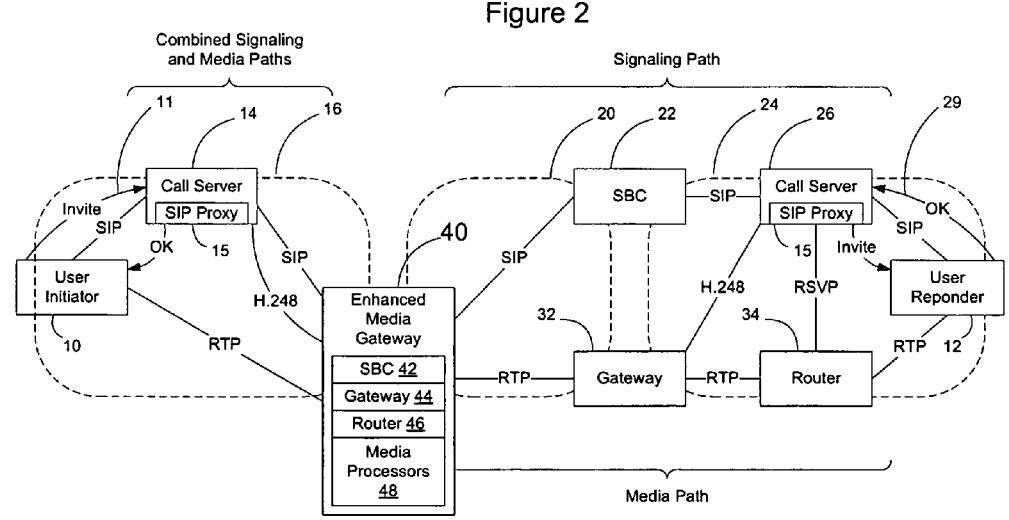
FIG. 2 is a functional block diagram of a network topology implementing an enhanced media gateway according to an embodiment of the invention.
Figure 3:
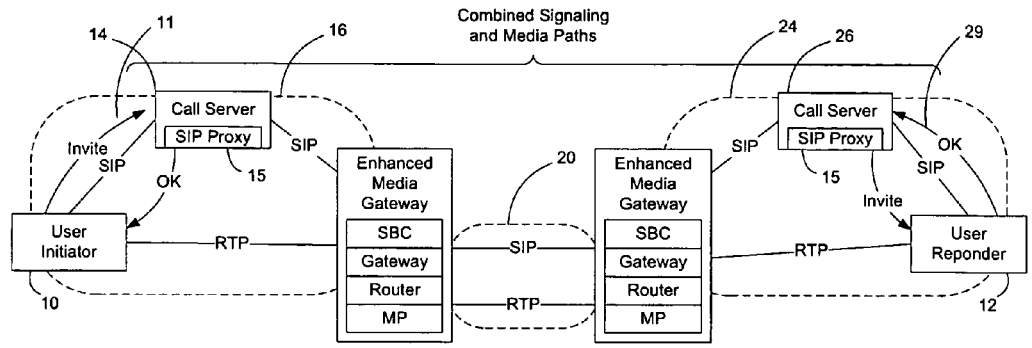
FIG. 3 is a functional block diagram of a network topology implementing two enhanced media gateways according to an embodiment of the invention.

FIG. 2 shows an example network in which the SBC, gateway, and router functions of the conventional example network have been combined to form an enhanced media gateway 40. FIG. 3 is similar to FIG. 2, except that two enhanced media gateways 40 (one on each side) are used to implement the session. The enhanced media gateway allows signaling and media paths to be set up at the same time or in a coordinated fashion so that the gateway that will be involved in handling the call may provide information related to the media path capabilities, which may then be used in connection with the signaling portion of the call establishment procedure. These parameters may then be passed directly from the signaling path to the media path so that the call server is not required to be involved in negotiation of those parameters, and is not required to signal those parameters to the enhanced media gateway. Implementing the signaling and media functions on an edge router further allows the call server to use a single interface to configure the media path to implement the session and reserve bandwidth for the session.

In the embodiment shown in FIGS. 2 and 3, call establishment proceeds as normal between the user initiator 10 and the user responder 12. Specifically, the user will send an invite message 11 to the call server, which implements a SIP proxy 15 on behalf of the user in a standard manner. However, when the call server 14 receives an invite, instead of sending the invite to the session border controller 18 it will pass the invite to the enhanced media gateway 40, which implements the gateway and session border controller functionality in an edge router.

The enhanced media gateway 40 allows several network roles to be combined into one network element, which allows the capabilities to be combined to increase the efficiency with which both the signaling and media paths may be set up for the call. In one embodiment, the enhanced media gateway provides a secure packet-based VoIP interconnect between different carrier networks and/or local networks for both voice media and voice signaling. Additionally, the enhanced media gateway provides a media interworking function which allows interworking between various media encodings, including codes and packetization rates. The media interworking function may also implement a conversion function to convert between transport layer protocols.

A router or other network element provides a solid framework for moving IP packets between different physical IP interfaces. The enhanced media gateway may be implemented as an application running inside a router or other network element. Implementing the enhanced media gateway on a router allows the call server to signal establishment of the call using standard call establishment methods, but also allows this signaling to be used to reserve bandwidth for the call on the network. Thus, network resource reservation may be offloaded from the call server to the enhanced media gateway. The enhanced media gateway may be implemented as shown in FIGS. 2 and 3 at the network edge, or optionally at another location within a carrier's network.

In the embodiment shown in FIGS. 2 and 3, the enhanced media gateway includes four main building blocks which work together to process both SIP messages and RTP media streams: an SBC module 42 which is responsible for implementing a signaling function, a gateway module 44 which is responsible for implementing a media function, a router module 46 which is responsible for implementing a routing function, and a set of media processors 48, such as Digital Signal Processors (DSPs), Network Processing Units (NPUs), or general purpose Central Processing Units (CPUs), that are responsible for processing traffic on a media session.

The SBC module 42 of the enhanced media gateway 40 is responsible for relaying SIP messages between two different network domains. To do this, the SBC module may be configured to perform network address translation so that the different networks may implement different IP address domains. The SBC module will also inspect signaling packets (such as SIP or H.323 packets) to ensure they are properly formatted and to enforce rate limits on signaling to prevent network resources, such as call servers, from becoming overloaded. By integrating the SBC module with the gateway module, the number of active sessions being handled by the media server on the network may be monitored and used to limit the number of sessions that are signaled by the SBC on the network. This allows SBC module to protect the media server by allowing the media server to provide the SBC with information as to the number of active media sessions to prevent too many media sessions from being established, and also allows the SBC module to protect the call server by preventing in-bound signaling in excess of particular limits from being passed to the call server.

The SBC module may also implement a Back to Back User Agent (B2BUA) such that the enhanced media gateway acts as a User Agent server on one side and as a User Agent client on the other (back-to-back) side. The basic implementation of a B2BUA is specified in IETF RFC 3261. The B2BUA acts as a proxy to both ends of a SIP call by terminating the inbound SIP session and immediately originating a new outbound session. Each call is tracked from beginning to end, allowing the operator of the B2BUA to offer value-added features to the call, such as billing, automatic call disconnection, and lowest cost routing.

The enhanced media gateway 40 also has a gateway module 44 that implements gateway features, such as conferencing, lawful intercept, TrFO, TFO, COT, digit collection, and announcements. The gateway module 44 also implements voice quality enhancement features such as Echo Cancellation (ECAN), ECAN CNG, BCN, AGC, BNR, MEC, time alignment, and artifact concealment. The gateway module 44 may also implement a number of codecs, such as G.711, G.729, G.726, RTAudio, AMR, ARM2, GSM EFR, EVRC, and EVRC-B. The gateway module interfaces with a bank of media processors 48 that can be configured to translate between codecs such that packets coded using one codec may be decoded using that codec and then re-encoded using another codec. This allows devices that that do not have a codec in common to establish a session and use the enhanced media gateway 40 as a translator. The gateway module 44 may receive parameters negotiated during signaling by the SBC to implement a media path for the session without involvement of the call server. This allows at least some of the parameter negotiation process normally implemented by the call server to be offloaded to the SBC, which may then directly program the parameters into the media path for the session.

The SBC module 44 processes incoming call setup messages received from the call server 14 and interfaces with the routing function implemented by the router 46 to establish connections between resources over the router's internal fabric. Specifically, when the gateway module 44 receives a call setup message containing parameters set by the call server, the gateway module may establish the media path for the session and will also interface with the router to cause the router to reserve bandwidth for the session. This allows the call server to use a media gateway control protocol, such as H.248, to establish the media path and reserve bandwidth without requiring the use of a reservation protocol such as RSVP. The gateway module 44 is configured to program the DSPs 48, if necessary, to implement the call on the network. The gateway module 44 will only insert a DSP resource into the media path if one is required. The gateway module also performs Network Address Translation (NAT) on RTP media packets so that calls can traverse different IP address domains.

Since the enhanced media gateway 40 is implemented in an edge router, the enhanced media gateway 40 includes a routing module 46 that allows the gateway to provide routing services. For example, the routing module 46 may implement routing features for both VoIP media and signaling, and can connect directly to a carrier's IP network edge. The routing module may support one or more routing protocols, such as Open Shortest Path First (OSPF), Intermediate System to Intermediate System (IS-IS), Routing Information Protocol (RIP), Static, Border Gateway Protocol (BGP), and Internet Control Message Protocol (ICMP). Other routing protocols may be supported as well, and additional routing functions may be performed by the routing module 46. The routing function may also implement traffic shaping and policing to apply rate limits to valid traffic and discard unauthorized traffic.

The router function 46 of the enhanced media gateway may also terminate VPNs or, alternatively, an edge router deployed in front of the enhanced media gateway may terminate VPNs on the network. Optionally, the router module 46 may be implemented as one or more virtual routers that can then be used to bridge calls or other sessions from devices in one enterprise VPN to devices in another VPN.

The routing module 46 is integrated with the media function to allow the enhanced media gateway to reserve resources for sessions. By tying the routing module and gateway module together, the call server may use the same signaling interface to control the enhanced media gateway to establish a session and to reserve bandwidth or obtain other routing services from the edge router. This offloads network resource reservation from the call server to thereby reduce of the amount of work required to be performed by the call server in connection with establishment of a session on the network.

The enhanced media gateway also includes a dense array of media processors 48 which can process packets to perform one or more functions on the session. For example, the media processors 48 may enable media interworking by transcoding. Media transcoding is necessary when a call is coded using two or more incompatible codecs, such as a GSM AMR codec and a CDMA EVRC codec. The DSP chips may operate on voice codecs, video codecs, or both. Some carriers might deploy transcoders in a central network location to optimize equipment cost while other carriers might position them at the network edges (as shown in FIG. 2) to optimize backbone bandwidth. The enhanced media gateway 40 may be used in either of these deployment models. The programmable media processors 48 may also implement voice quality enhancements to an RTP stream as described in greater detail above.

In operation, some of the parameters associated with a session such as the codec to be used on the session will be negotiated by the SBC module and directly programmed to the media function. Other parameters to be implemented on the session and the voice quality enhancements to be applied to the session may be negotiated by the call server. The call server will pass these aspects of the call to the enhanced media gateway using a media gateway control function such as H.248. The media function, upon receipt of the call parameters from the signaling function and from the call server, will program the media processors to implement the session by causing the media processors to be configured to implement the correct transcoding and voice quality enhancement features. The media function will also interface the routing function to reserve bandwidth for the session, and cause the media path to be established to include the reserved bandwidth and the configured media processors.

Figure 4:
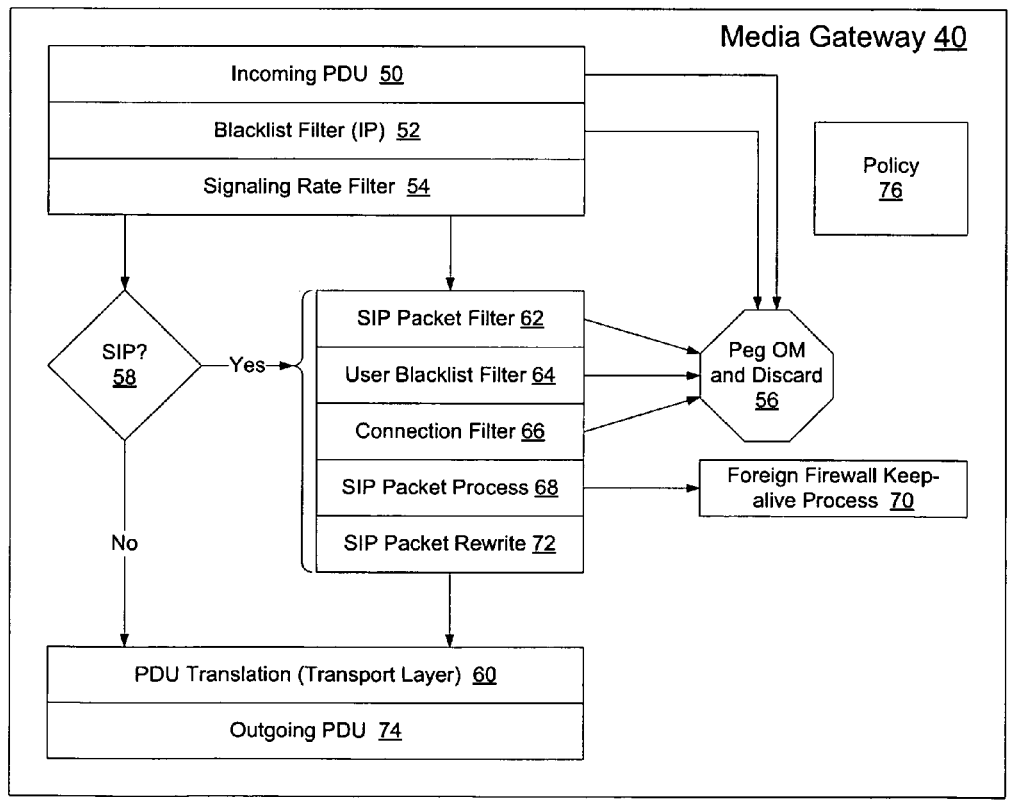
FIG. 4 is a functional block diagram of a subsystem architecture of an enhanced media gateway according to an embodiment of the invention.

FIG. 4 shows an example of a subsystem architecture for the enhanced media gateway to illustrate how the SBC, media gateway, and router modules operate together to establish and implement a session on the network. As shown in FIG. 4, the enhanced media gateway 40 receives incoming PDUs 50 and applies a blacklist filter 52. The blacklist filter 52 allows the enhanced media gateway to be configured by a network administrator to discard incoming messages from a specific source address or which match other filtering parameters. This allows the enhanced media gateway to be configured to combat VoIP spam and general network malfunctions. Since multiple subscribers can be blacklisted, this data is organized as a list. Although not shown, alternatively whitelists also may be used to specify known good traffic to enable the enhanced media gateway to filter traffic such that only traffic generated by known entities is allowed to participate in SIP sessions instead of specifying those entities which are not allowed to participate in SIP sessions.

After applying the blacklist or whitelist filters, the enhanced media gateway applies a signaling rate limit 54. Specifically, to protect call servers from overload, the enhanced media gateway applies rate limits to the signaling channel. The signaling rate filter 54 allows the enhanced media gateway to temporarily disable session originations from a particular subscriber or groups of subscribers. If the incoming PDU is blacklisted or doesn't pass the signaling rate limit filter, an OM is pegged, and the PDU is discarded 56. The signaling rate filter 54 may use information from the media function, such as the number of sessions implemented by the enhanced media gateway, to determine if the signaling rate filter has been exceeded. Specifically, by providing feedback from the media function to the signaling function, the signaling function may be provided with information as to the current number of sessions implemented on the enhanced media gateway or the recent number of sessions implemented via the enhanced media gateway to determine if a signaling threshold has been exceeded. Thus, by integrating the signaling function of the enhanced media gateway with the media function of the gateway, it is possible to allow the call server to be protected by limiting the amount of inbound signaling that is passed to the call server.

If the incoming PDU passes the filters 52, 54, it is checked to determine if it is a SIP message 58. If the message is not a SIP message, and hence is a PDU that is carrying data, the enhanced media gateway will perform Network Address Translation (NAT) 60 to translate the IP addresses and port information to its own local IP addresses and port information, and output the packet 74. The enhanced media gateway will thus rewrite outgoing packets by replacing the information contained in the VIA field with its own IP address and port. This allows the enhanced media gateway to remain in the media path for the entire call, and removes foreign firewall addresses. Similar translations are also applied to SIP packets as described below. If the PDU is a SIP packet, however, the enhanced media gateway will further look deeper into the packet to determine any additional buried addresses. Any IP addresses buried inside Session Description Protocol (SDP) envelopes attached to SIP messages are also modified to reflect the enhanced media gateway's IP addresses. The enhanced media gateway will implement the protocol transcoding, codec transcoding, and voice quality enhancements as part of the packet output process 74.

If SIP signaling is being used (Yes at block 58), the enhanced media gateway will implement several additional processes in connection with handling the SIP signaling message. For example, the enhanced media gateway may support SIP packet filters 62 that allow SIP packets not meeting particular criteria to be filtered and ignored. For example, the enhanced media gateway may implement SIP packet filters 62 to look for malformed or unexpected packets, so that any malformed or unexpected SIP packet will be discarded. The SIP packet filters may also allow redundant or low-priority SIP messages to be suppressed. For example, the SIP packet filters may be used to suppress SIP REGISTER messages where the subscriber and IP address have not changed from the last message.

The enhanced media gateway also supports blacklisting by a subscriber, via blacklist filters 64, which allows the enhanced media gateway to temporarily disable session originations from a particular subscriber or set of subscribers. Since multiple subscribers can be blacklisted, this data is organized as a list. The enhanced media gateway also implements connection admission control, which allows a maximum number of active sessions to be specified for each Signaling Proxy. By implementing the signaling and media functions in such a way that they are allowed to exchange information, the signaling function may be provided with access to the number of active sessions currently being supported by the media function to enable the enhanced media gateway to use the signaling function to control the number of active sessions on the enhanced media gateway. If any of these filters are exceeded, i.e. for incoming calls which exceed one of these values, an OM is pegged and the call is dropped. Emergency calls may be given special priority and not dropped even if they normally would be caused to be dropped by one of the filters 62, 64, 66.

If the packet is not dropped, the enhanced media gateway will process the packet 68. To ensure that a foreign firewall keeps its signaling ports open, the enhanced media gateway will implement a foreign firewall keep-alive process 70 which will ask registering phones to periodically re-register. Alternatively, the enhanced media gateway will periodically send OPTIONS messages to each registered phone.

The enhanced media gateway will implement a SIP packet rewrite process 72 as part of the B2BUA to allow the SIP packets to be rewritten. This process allows additional information such as additional codec information to be inserted into the SIP packet or a SDP envelope attached to the SIP message. The SIP message will then be passed to the PDU translation process 60 and output 74 from the enhanced media gateway.

A policy module 76 allows the network operator or other user to specify which of the several features described in connection with FIG. 4 should be implemented and how they should be implemented. The policy data may be provisioned differently against each signaling proxy application instance, so that different signaling proxies may operate differently. For example, the policy module may allow the following aspects to be provisioned for each signaling proxy application: public and private signaling IP addresses and ports; public and private media IP addresses and ports; local call server IP address, port, transport protocol, and signaling protocol; foreign call server IP address, port, transport protocol, and signaling protocol; virtual router identifier; and CPX.

The policy module 76 may also contain information to specify which set of features of a particular signaling proxy application instance are active, and how that feature should operate. Examples of types of things that may be provisioned via policy module 76 include the signaling proxy application service state (enabled/disabled—if disabled, all messages will be discarded); discard malformed SIP packets (enabled/disabled) which is relevant to the SIP packet filter 62; foreign firewall keep-alive interval—if set to zero, keep-alives will not be sent which allows the operation of the foreign firewall keep-alive process 70 to be specified; blacklisted subscriber list relevant to user blacklist filter 64; and blacklisted IP address list which is relevant to the connection filter 66.

Limits may also be specified in the policy 76 for each signaling proxy application instance that may be used in the signaling rate filter 54 to protect the call servers from overload conditions. Examples of the types of limits that may be specified via policy 76 include the maximum messaging rate on the signaling channel (inbound); maximum messaging rate on the signaling channel (outbound); maximum number of concurrent sessions implemented by the media server; maximum rate of invite messages (inbound); and maximum rate of invite messages (outbound).

Figure 5:
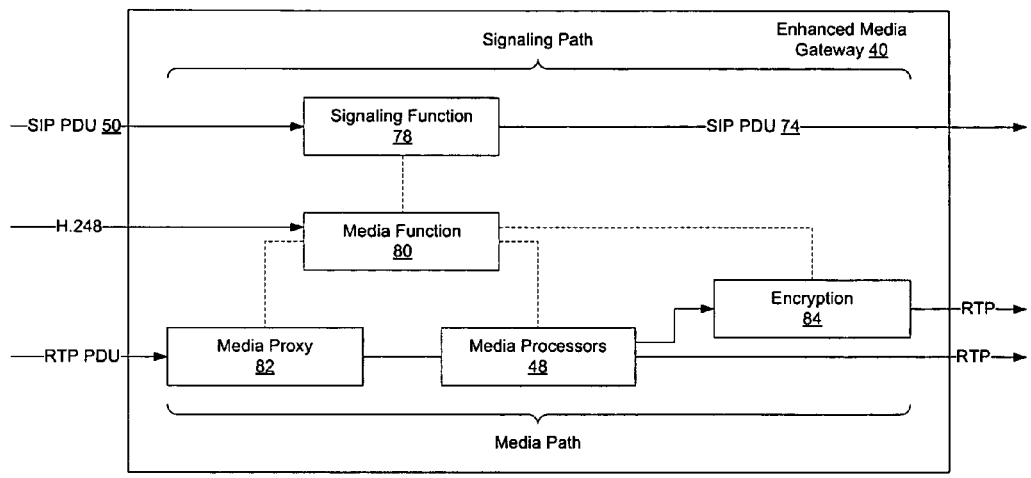
FIG. 5 is a functional block diagram of a data plane of an enhanced media gateway according to an embodiment of the invention.

FIG. 5 shows the data plane of an enhanced media gateway 40 and shows the interrelationship between a signaling function 78 implemented by the SBC module 42, a media function 80 implemented by the gateway 44, and the media path implemented by the router 46 and media processors 48. In the embodiment shown in FIG. 5, the media function 80 resides between the signaling path and a media path. Specifically, the signaling path is implemented by a signaling function 68 which receives SIP signaling messages 50, processes the SIP messages as described in greater detail above in connection with FIG. 4, and outputs SIP messages 74. The SIP messages output from the signaling function may be modified, as described herein, to contain additional or modified information.

Parameters for sessions negotiated by the signaling function may be provided to the media function and used to program the media path for the session without requiring those' parameters to be negotiated by the call server. Additionally, the call server may interface with the media function, e.g. using a media gateway messaging protocol such as H.248, to enable the call server to enable the call server to instruct the enhanced media gateway to implement the session. The call server may thus provide the media function with additional parameters associated with the session that may also be programmed into the media path. Additionally, upon receipt of the session messaging by the media function, the media function may obtain routing resources for the session to thereby allow the call server to achieve resource reservation for the session without requiring the call server to separately interface with network routers or a network controller to reserve bandwidth for the session.

The media path includes the bandwidth reserved by the media function. The media path also includes a media proxy 82 that performs the PDU transcoding (block 60 of FIG. 4) so that different IP addresses may be used on different network domains, and so that different protocol formats may be used on the different domains. The media function 80 also programs the media processors 48 to implement the correct codec or codec translation to handle the call in the media path and to perform any voice quality enhancements specified by the call server for the session. Where encryption is to be used, the media function may also cause the correct encryption parameters, such as keys, etc., to be passed to an encryption engine 84 to be used to handle the data for the session.

Figure 6:
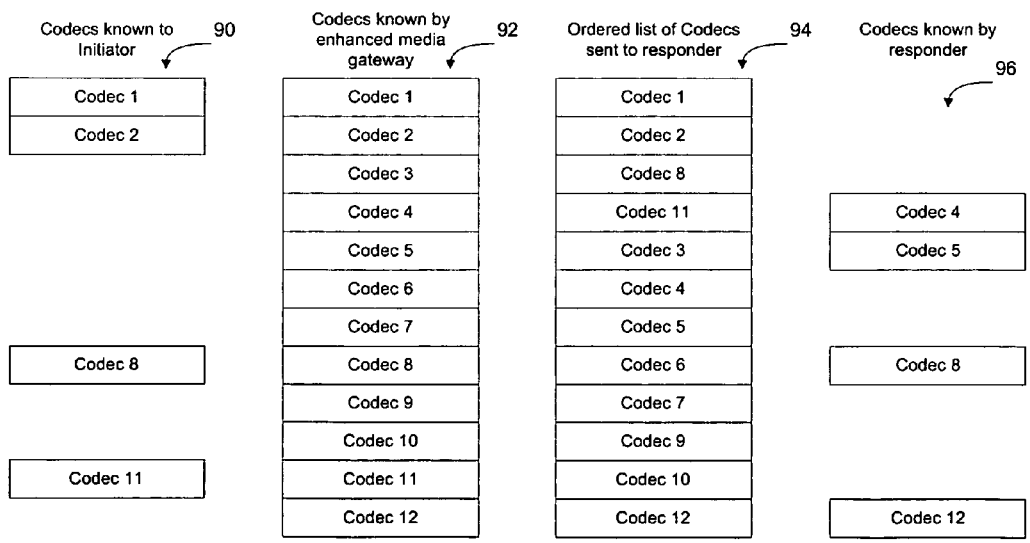
FIG. 6 is a diagram showing a way of negotiating codecs between initiator and responder using an enhanced media gateway according to an embodiment of the invention.
Figure 7:
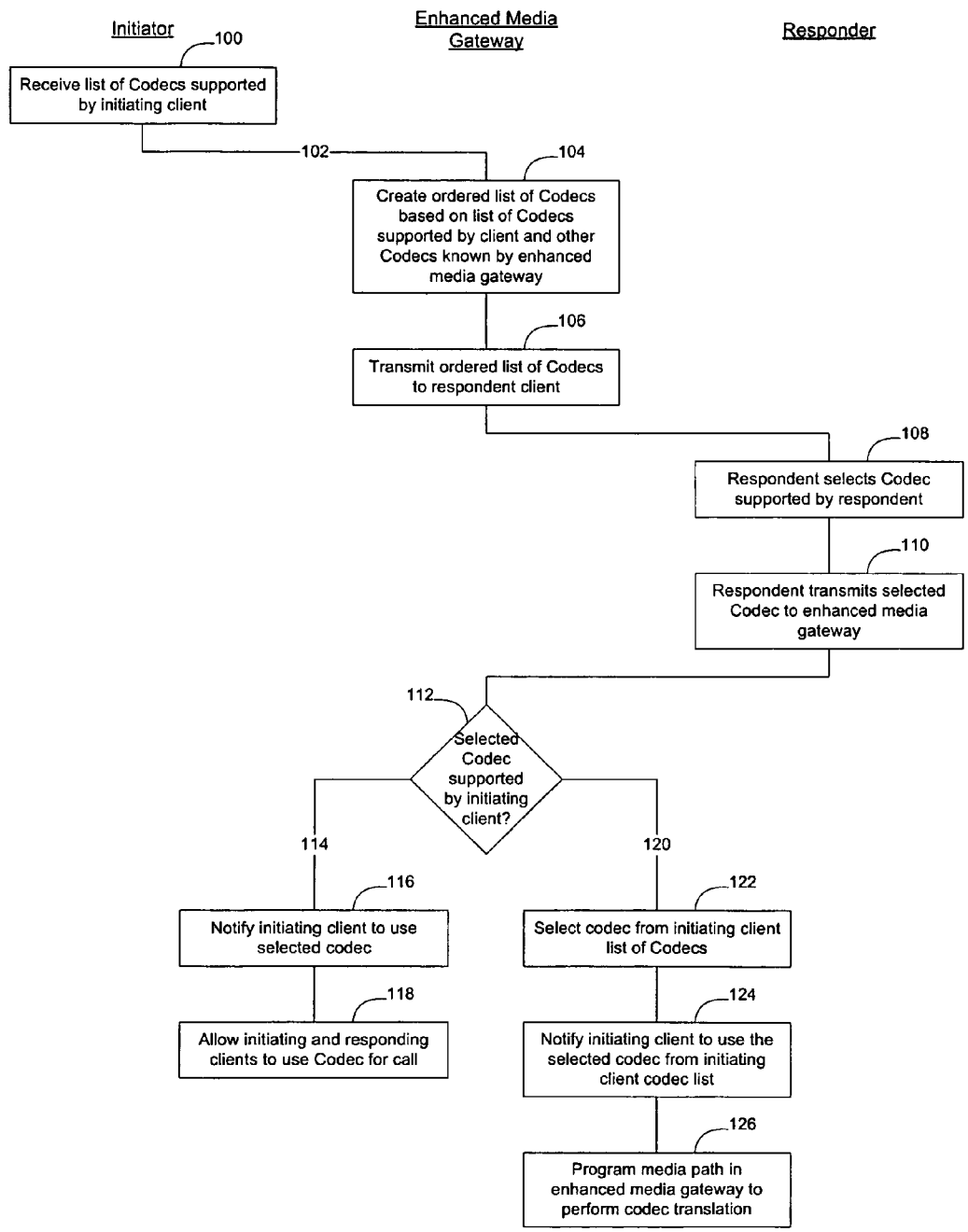
FIG. 7 is a flow chart illustrating a process of negotiating codecs between initiator and responder according to an embodiment of the invention.

As described in greater detail above, the enhanced media gateway allows the signaling path and media path to be implemented together so that establishment of the media path and signaling path may be coordinated. FIGS. 6 and 7 will be used to provide an example of how this process may be used to provide enhanced functionality on the network not available through the use of separate SBC and media gateways.

As described in greater detail above, to initiate a SIP session an initiator will transmit a SIP invite message 11. The SIP invite message will generally have a SDP container attached thereto that contains a list of codecs 90 that the initiator is able to use to implement a call. Column 1 of FIG. 6 illustrates a hypothetical list of codecs 90 that may be supported by an end device and provided in connection with an invite message. According to an embodiment of the invention, the enhanced media gateway 40 may supplement the original list of codecs when the enhanced media gateway sends out the invite message toward the responder. The supplemented list may contain the original list of codecs appended with an additional list of codecs that are known to the enhanced media gateway. This allows the responder to select either from the original list of codecs or from the additional list of codecs to enhance the possibility that the responder will be able to accept the invite.

When the signaling function receives the response message from the responder, the signaling function may extract the selected codec and pass the codec to the media function, so that the media function knows what codec to use to implement the session. Normally, codec negotiation is implemented by the call server. By integrating the signaling and media functions this aspect of session negotiation may be offloaded from the call server to reduce the workload on the call server. Where the responder chooses one of the additional codecs that were added to the original list, the pair of codecs for the session may be passed to the media function 08 to allow the media function to program the media processors 48 to implement the required transcoding.

FIGS. 6 and 7 show a process of codec negotiation that may be implemented by the enhanced media gateway on behalf of the call server. FIG. 6 shows graphically the process of how codecs may be selected and ordered for transmission in connection with an invite message, and FIG. 7 shows a flow chart of the process that may be implemented. For convenience, both of these figures will be discussed collectively as they graphically illustrate different aspects of the same process.

When the signaling function 78 receives a SIP invite containing a list of codecs supported by the initiator (100) the signaling function will obtain a list of codecs 92 known to the media function 80 and supported by the enhanced media gateway 40 (102). The signaling function 78 may thus supplement the list of codecs contained in the SIP invite 90 or a related SDP envelope to also include an additional list of codecs 92 that are supported by the gateway 40 but which are not supported by the device that sent the SIP invite.

When the signaling function 78 creates a new SIP invite to be transmitted from the enhanced media gateway 40, the new SIP invite or associated SDP envelope may contain an ordered list of codecs 94 containing both the original codec list 90 from the initiator and the additional codecs 92 that are also supported by the gateway (104). The list 94 is created to have the codecs known to the initiator in a location where they will be preferentially selected by the responder, so that the amount of translation required to be implemented by the enhanced media gateway may be minimized. The SIP invite containing the updated list will then be transmitted to the responder (106).

The responder will be able to support one or more codecs 96 which may or may not include one of the original codecs 90 supported by the initiator. The responder will select one of the codecs from the ordered list 94 if any match the list of codecs supported by the responder (108). Because the list of available codecs has been increased in size, the responder is more likely to support one of the codecs in the list and, hence, the session is more likely to be successful. Specifically, if the responder does not support one of the codecs supported by the initiator, the responder may still accept the session by selecting one of the codecs supported by the gateway but not by the initiator. The responder will then transmit the selected codec to the enhanced media gateway (110) in connection with the OK message 29.

When the enhanced media gateway receives the SIP OK message accepting the invite, it will determine if the selected codec was supported by the initiating user or not (112). If the codec is supported by both the initiator and the responder (114) the enhanced media gateway will notify the call server of the selected codec (116). The initiating and responding clients will then use the negotiated commonly supported codec for the session (118).

Where the responder selects one of the codecs 92 supported by the enhanced media gateway 40 but not the initiator 10 (120), the gateway will program the media processors 48 to implement a transcoding function to allow the call to be established despite the fact that the initiator and responder are not able to implement the same codec. Thus, the signaling function will select a codec from the list of codecs 90 supplied by the initiating user (122), notify the initiator to use that codec (124) and instruct the media function to program the media path to translate between codecs used by the initiator and responder during the session (126).

In the example shown in FIG. 6, assume that the initiator is able to support codecs 1, 2, 8, and 11. When a SIP invite is received at the enhanced media gateway 40, the signaling function 78 will poll the media function 80 to determine which additional codecs 92 are supported. In the example shown in FIG. 4 it has been assumed that the enhanced media gateway supports codecs 1-12. The media function will return the list of additional supported codecs and those codecs not already contained in the SIP invite will be added to the end of the code list. In the illustrated example, therefore, the SIP invite contains an ordered list of codecs 1, 2, 8, 11, 3-7, 9-10, and 12. The codecs supported by the initiator are at the top of the ordered list so that one of these codecs will be preferentially selected by the responder, if the responder is able to implement one of those codecs.

When the responder receives the SIP invite it will go through the list 94 to determine the first codec from the list that matches a codec 96 supported by the user responder. In the illustrated example, the first supported codec in the list known by the responder is codec 8. This also happens to coincide with one of the codecs supported by the initiator. Since it is indicated to the responder as an available codec it will be selected for implementation of the call. The responder may be unaware that the codec is supported only by the enhanced media gateway and not by the initiator.

When the responder sends back an accept message, the responder will specify which codec has been selected for the call. Where the codec was part of the initial list of codecs 50 supplied by the initiator, that codec will be used to implement the call. In the illustrated example both the initiator and the responder support codec 8, so that this codec may be used without translation by the enhanced media gateway. Where, however, the codec selected by the responder is not part of the initial list 90, the signaling function will notify the media function 80 of the translation requirement for the session, to enable the media function to program the media path, e.g. media processors 48, so that the media path may implement the codec translation for the session. The codec selected for use by the initiator may then be communicated to the initiator in a SIP accept message.

Integrating the signaling functions and media functions thus has the synergistic effect of enabling media path capabilities to be used to augment the signaling function, which may thus increase the chance that a call or other session may be completed between an initiator and responder. Additionally, since the signaling and media functions are able to communicate, the media function may be instructed by the signaling function to program at least some of the parameters of the media path without involvement of the call server to thereby offload some of the responsibilities of the call server to the enhanced media gateway.

The media function may implement this by causing one or more of the media processors and/or encryption processes in the data plane of the router to be programmed to implement the media path (codec translation and voice quality enhancements) without requiring separate signaling protocols to be used to communicate this information to an external network device. Additionally, by implementing this functionality on a router, it is possible to set up the routing at the same time to reserve bandwidth on the router for the call in connection with signaling the call and without requiring the call server to separately implement this reservation. This allows the call server to implement a media gateway protocol such as H.248 to pass the required parameters for the session to the media function, which may then obtain the necessary bandwidth and other data path features from the router to implement the session on the data plane of the router. Moreover, where the call is to take place in a secure manner, such as over a VPN, the media function may cause the router to negotiate and terminate a VPN for the session, to thereby integrate the whole process.

The enhanced media gateway may work with audio codecs, as described above, or may also be used in connection with video codecs. Thus, the session may be an audio e.g. voice session, a video session, or other type of session. Different cell phones support different video codecs, most of which are not popular among computer users. Thus, where a cell phone and computer are to engage in a video telephone conference it is likely that a codec conversion process may need to be implemented. Accordingly, the enhanced media gateway in one embodiment may be configured to translate between incompatible video codecs as well as between incompatible audio codecs. Optionally, the enhanced media gateway may need to do both types of translation on a given session. Examples of video codecs that may be supported include MPEG2, MPEG4, H.261, H.263, H.264, VC1/WMV, ON2 VP6 (Skype), and AVS (China). Examples of audio codecs that may be supported include AAC, AMR, or QCELP. Other audio and/or video codecs may also be used and the enhanced media gateway may likewise be modified to support new codecs as they are developed.

The media function of the enhanced media gateway may program the media path to enable the enhanced media gateway to serve to adapt videos for optimal viewing on different devices. This might include transforming a video from 320×240 pixels into 128×96 pixels while maintaining its aspect ratio. Other options include dropping video frames (from 25.0 frames per second (fps) to 12.0 fps) or lowering the overall video codec's bit rate for one end of the call.

Other features that may be implemented by the enhanced media gateway include synchronizing audio with video, inserting video announcements such as advertisements into video calls, inserting video banner overlays such as carrier logos or administrative information such as talk time remaining. The video banner overlays may optionally be displayed in scrolling banner. The enhanced media gateway may also mix video signals from different sources so that all parties in a video conference are displayed on the same screen at once, for example in different quadrants or separate areas of the screen. As the amount of bandwidth changes the video rate may be shifted by the enhanced media gateway to take advantage of the available radio frequency bandwidth. These functions and other additional functions may be implemented by the media function under the instruction of the call server.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of establishing a plurality of multimedia sessions extending from a first network into a second network, comprising: in an enhanced media gateway in the first network:
   implementing a signaling function to handle signaling of the sessions from the first network into the second network;
   implementing a media function to handle traffic on the sessions, the media function being configured to program parameters associated with the sessions into media processors to enable the media processors to implement transcoding and voice quality enhancement features on the sessions; and
   wherein the signaling function and media function are instantiated on the enhanced media gateway and sufficiently integrated to enable information about sessions being handled by the media function to be provided to the signaling function and used to affect signaling of new multimedia sessions extending from the enhanced media gateway in the first network into the second network;
   wherein the media function is instructed, without involvement of a call server, by the signaling function to program the media processors with a codec selection parameter that indicates a codec translation to be implemented for handling the traffic on the sessions in the event the signaling function receives a codec list from an initiator end device in the first network and a codec selection from the responder end device in the second network, wherein the codec selection does not match a codec entry in the codec list;
   wherein the media function provides a transcoding function for the sessions, and wherein the signaling function negotiates transcoding parameters for the sessions in concert with the transcoding abilities of the media function; and
   wherein the negotiated transcoding parameters including pairs of selected codecs for the sessions are passed from the signaling function to the media function without the use of a signaling protocol, to enable the media function to program the media processors to perform the required transcoding for the sessions.

2. The method of claim 1, wherein the signaling function implements a back to back user agent configured to terminate sessions on a first network and instantiate sessions on a second network, the back to back user agent performing network address translation to translate addresses associated with the session on the first network to addresses associated with the session on the second network.

3. The method of claim 1, wherein the media function is configured to establish a media path for each session that is required to span from the first network into the second network.

4. The method of claim 1, wherein the enhanced media gateway includes a router implementing a routing function, and wherein the media function and routing function are sufficiently integrated to enable the media function to interact with the routing function to reserve bandwidth on at least one of the networks for the sessions.

5. The method of claim 4, wherein the steps of establishing the media path and reserving bandwidth are able to be performed without the use of a signaling protocol.

6. An enhanced media gateway, comprising:
   a signaling function to perform session signaling related to establishment of a communication session on a network;
   a media function to program a media path for the communication session in the enhanced media gateway, the media function receiving at least one parameter from the signaling function describing an aspect of the communication session that was established by the signaling function, wherein the media function is instructed, without involvement of a call server, by the signaling function to program media processors in the enhanced media gateway with the at least one parameter that indicates a codec translation to be implemented for handling traffic on the media path in the event the signaling function receives a codec list from an initiator end device in a first network and the codec selection from a responder end device in the second network, wherein the codec selection does not match a codec entry in the codec list that enables the media processors to handle traffic on the media path, wherein the at least one parameter includes a codec selection parameter; and
   a routing platform, the routing platform being configured to receive a bandwidth reservation request from the media function to reserve bandwidth for the communication session hosted by the enhanced media gateway, wherein the signaling function, media function, and routing platform are instantiated on the enhanced media gateway;

wherein the media function provides a transcoding function for the sessions, and wherein the signaling function negotiates transcoding parameters for the sessions in concert with the transcoding abilities of the media function; and wherein the negotiated transcoding parameters including pairs of selected codecs for the sessions are passed from the signaling function to the media function without the use of a signaling protocol, to enable the media function to program the media processors to perform the required transcoding for the sessions.

7. The enhanced media gateway of claim 6, wherein the media function provides capability information to the signaling function for use in performing session signaling related to establishment of the communication session on the network.

8. The enhanced media gateway of claim 7, wherein the capability information comprises information related to codecs supported by the media function.

9. The enhanced media gateway of claim 7, wherein the capability information comprises an indication of a number of active sessions implemented by the media function on the media path.

10. The enhanced media gateway of claim 6, wherein the signaling function implements a back to back user agent.

11. The enhanced media gateway of claim 6, wherein the media function receives additional parameters describing the communication session from a call controller and uses the additional parameters to set up the media path.

12. The enhanced media gateway of claim 11, wherein the media function further receives a bandwidth reservation request associated with the communication session from the call controller and passes the bandwidth reservation request from the media function to the routing platform to reserve bandwidth for the communication session on the enhanced media gateway.

13. The enhanced media gateway of claim 12, wherein the media function receives the additional parameters describing the communication session and the bandwidth reservation request via a common interface to the call controller.

\* \* \* \* \*